United States Patent [19]

Boshnyaga et al.

[11] 4,013,942
[45] Mar. 22, 1977

[54] PHASE SHIFTER

[76] Inventors: Valery Anatolievich Boshnyaga, 1, Kostjuzhensky pereulok 1; Lev Pavlovich Kalinin, ulitsa Stefana Velikogo 51-a, kv. 35; Vitaly Mikhailovich Postolaty, ulitsa Demokraticheskaya 6/1, kv. 58, all of Kishinev, U.S.S.R.

[22] Filed: July 21, 1975

[21] Appl. No.: 597,888

[30] Foreign Application Priority Data

July 22, 1974 U.S.S.R. ............................ 2048088
July 22, 1974 U.S.S.R. ............................ 2048097
July 22, 1974 U.S.S.R. ............................ 2048099
July 22, 1974 U.S.S.R. ............................ 2048092

[52] U.S. Cl. .................................. 323/119; 323/120
[51] Int. Cl.² ........................................ H02J 3/00
[58] Field of Search ............ 307/17; 323/6, 48, 50, 323/56, 62, 83, 86, 108, 119, 120; 328/155

[56] References Cited

UNITED STATES PATENTS

| | | | |
|---|---|---|---|
| 2,421,300 | 5/1947 | Stephens | 323/120 X |
| 3,184,675 | 5/1965 | Macklem | 323/86 X |
| 3,610,944 | 10/1971 | Mitsui et al. | 307/17 |
| 3,611,224 | 10/1971 | Becker | 323/56 X |

*Primary Examiner* — A. D. Pellinen

[57] ABSTRACT

A phase shifter having two multiwinding transformers. The primary windings of the like phases of different transformers are connected in series and arranged in a three-phase system. The secondary windings of unlike phases of different transformers are interconnected and form two three-phase output voltage sets. Each transformer has control windings connected to respective switching devices. Actuation of a respective switching device provides for changing the phase angle between the three-phase output voltage sets from 0° to 120° or 180°.

4 Claims, 23 Drawing Figures

PHASE SHIFTER

The present invention relates to transformers, and more particularly to phase shifters.

The invention can most advantageously be used for controlling the operation of power transmission systems of high power-carrying capacity.

Power transmission systems of high power-carrying capacity are normally made up of three-phase lines. These lines are spaced as little apart as can be tolerated from the viewpoint of phase-to-phase overvoltage. By adjusting the phase shift or angle between the three-phase voltage sets at the entry to different lines, one can determine the amount and sign of line-to-line electromagnetic influence, hence set the limit of the power being transmitted. Symmetrical adjustment of the phase shift between the threephase voltage sets at the entry to different power transmission lines provides for the possibility to change the limit of the power being transmitted within a wide range without affecting the homogeneity of the lines making up a power transmission system of high power-carrying capacity. The advantages of power transmission systems of high power-carrying capacity can be most fully realized provided they have means for adjusting the phase shift. The latter can be adjusted continuously or discretely. Continuous adjustment is an effective means for making full use of the adjustability of a power transmission system of high power-carrying capacity. However, it complicates the adjusting means, as well as the control system, maintenance and operation. Discrete adjustment, on the other hand, is advantageous in its simplicity, high reliability and speed. It is particularly instrumental in the case of a clearly defined repetitive-peak load curve.

A prior art phase shifter comprises three groups of single-phase transformers whose primary windings are connected to a three-phase network. The primary windings of all the three groups are connected in series to form three primary circuits in a star or delta arrangement. The secondary windings of the three transformers of each group are also connected in series to form three secondary circuits in a star or delta arrangement. The transformers also have two counteractive d-c bias windings, one of these windings providing for magnetic bias while the other serves as a control winding. To make for a phase shift of ± 120°, the bias windings are provided only on two transformers, whereas the control windings are provided on all three. In the initial state, there is no current through the control winding, while flowing through the magnetic bias winding is direct current saturating the cores of respective transformers. As a result, in each group of primary windings, the supply voltage is applied to the primary winding of the non-saturated transformer. In each group of secondary windings, the voltages across the saturated transformer phases are equal to zero, while the output voltage of each group of secondary windings is equal to the non-saturated transformer secondary voltage, both in phase and in magnitude. In this case, the output voltage of all the three groups of secondary windings form a three-phase set of output voltages. As direct current is fed to the control winding, the transformer operating under conditions of free magnetization (non-saturated transformer) becomes saturated, while one of the saturated transformers becomes non-saturated. The output voltage of each group of secondary windings has its phase shifted through 120°. In the case of reversal of the direct current through the control winding, the phase of the output voltage of each secondary winding group is shifted through −120°.

The above-described known phase shifter falls to provide for symmetric adjustment of the phase angle between two output voltage sets, which is required for the operation of power transmission systems of high power-carrying capacity, and introduces high longitudinal resistance into the load circuit. In addition, the installed power of the phase shifter is three times as high as the maximum load power.

These disadvantages substantially limit the application of the prior-art phase shifter in three-phase voltage sets in power transmission systems of high power-carrying capacity.

It is an object of the present invention to provide a phase shifter capable of regulating the operation of a power transmission system of high power-carrying capacity by symmetrically adjusting the phase shift between two three-phase voltage sets at the entry to the power transmission system lines, the phase shifter having its installed power reduced as well as the resistance introduced into the load circuit.

This object is attained by that in a phase shifter comprising three-phase multiwinding transformers each having primary windings connected in series, for each phase, and arranged in a three-phase system, secondary windings and control windings, the secondary windings of the first transformer being connected to those of the second transformer, the first transformer is, according to the invention, provided with additional secondary windings to form two three-phase output voltage sets, the secondary windings of the second transformer having their ends connected in a three-phase system, while the beginning of each secondary winding has connected thereto at least two secondary windings of the first three-phase transformer: in addition, the control windings of each three-phase transformer are connected to respective switching devices which short the control windings, thereby setting the required phase angle between the three-phase output voltage sets.

It is advisable that the ends of the secondary windings of all phases of the second three-phase transformer be connected to a common neutral point, while the beginnings of the secondary winding of each phase of the second three-phase transformer should have connected thereto the beginnings of the secondary windings of the other two phases of the first three-phase transformer.

It is also advisable that the secondary windings of the second three-phase transformer be delta-connected with each apex of the delta having connected thereto the common point of respective series-aiding-connected secondary windings of the first three-phase transformer, the phase of the voltage across the latter windings coinciding with that of the voltage across the secondary winding of the second three-phase transformer, opposite a respective delta apex.

The first three-phase transformer should preferably have third and fourth secondary windings, each having its end connected to that of one of the first two secondary windings, namely to that which is different in phase, as well as to a respective secondary winding of the second three-phase transformer.

Preferably, the ends of the secondary windings of all phases of the second three-phase transformer should be connected to a common neutral point, while the beginning of each of these windings should have connected thereto the common point of two series-aiding-connected secondary windings of the first three-phase transformer, the phase of the voltages across the latter windings following that of the voltage across a respective secondary winding of the second three-phase transformer, in a preset phase alternation sequence in the power transmission system.

The herein disclosed phase shifter makes it possible, with its control windings shorted, to symmetrically adjust the phase shift between the three-phase sets of the output voltages at the entry to different lines of a power transmission system of high power-carrying capacity.

The invention will be more fully understood from the following detailed description of preferred embodiments thereof with reference to the accompanying drawings, wherein.

The proposed phase shifter comprises two three-phase multiwinding transformers. The primary windings $W_{1\beta\ A}$ (FIG. 1a–1d) and $W_{1\ \beta\ A}$ of phase A, $W_{1\ \alpha\ B}$ and $W_{1\ \beta\ B}$ of phase B, $W_{1\ \alpha\ C}$ and $W_{1\ \beta\ C}$ of phase C of the first ($\alpha$) and second ($\beta$) three-phase transformers, respectively, are series- and star-connected with a common point 0. Applied to beginnings 1 of the primary windings $W_{1\ \alpha\ A}$, $W_{1\ \beta\ B}$ and $W_{1\ \alpha\ C}$ of the first transformer $\alpha$ are voltages $E_A$, $E_B$ and $E_C$ from a three-phase power supply. The first three-phase transformer $\alpha$ has secondary windings $W_{2\ \alpha\ A}$, $W_{2\ \alpha\ B}$, $W_{2\ \alpha\ C}$ and $W'_{2\ \alpha\ A}$, $W'_{2\ \alpha\ B}$, $W'_{2\ \alpha\ C}$ of phases A, B and C, respectively. The second three-phase transformer $\beta$ has secondary windings $W_{2\ \beta\ A}$, $W_{2\ \beta\ B}$ and $W_{2\ \beta\ C}$ of phases A, B and C, respectively. The secondary windings $W_{2\ \beta\ A}$, $W_{2\ \beta\ B}$ and $W_{2\ \beta\ C}$ of phases A, B and C, respectively, have their ends 2 star-connected with a common point 0'. In the description that follows, all winding ends are designated as 2, while all winding beginnings are designated by 1. Connected to the beginning 1 of the secondary winding $W'_{2\ \beta\ A}$ of the second transformer $\beta$ are the beginnings 1 of the secondary windings $W'_{2\ \alpha\ B}$ and $W_{2\ \alpha\ C}$ of the first transformer $\alpha$. Connected to the beginning 1 of the secondary winding $W_{2\ \beta\ B}$ of the second transformer $\beta$ are the beginning 1 of the secondary windings $W'_{2\ \alpha\ C}$ and $W_{2\ \alpha\ A}$ of the first transformer $\alpha$. And connected to the beginning 1 of the secondary winding $W_{2\ \beta\ C}$ of the second transformer $\beta$ are the beginnings 1 of the secondary windings $W'_{2\alpha\ A}$ and $W_{2\ \alpha\ B}$ of the first transformer $\alpha$. Output voltages $\dot{E}'_A$, $\dot{E}'_B$, $\dot{E}'_C$ and $\dot{E}''_A$, $\dot{E}''_B$, $\dot{E}''_C$, their sequence starting from the point $O'$, form, respectively, two three-phase output voltage sets symmetrical with the three-phase power supply. Control windings $W_{c\ \alpha\ A}$, $W_{c\ \alpha\ B}$ and $W_{c\ \alpha\ C}$ FIG. 1c of the first transformer $\alpha$ are star-connected and coupled to a switching device 3. Control windings $W_{c\ \beta\ A}$, $W_{c\ \beta\ B}$ and $W_{c\ \beta\ C}$, FIG. 1d, of the second transformer $\beta$ are also star-connected and coupled to a switching device 4. It is assumed, in the description of other embodiments of the phase shifter, that the control windings $W_{c\ \beta\ A}$, $W_{c\ \beta\ B}$, $W_{c\ \beta\ B}$ and $W_{c\ \alpha\ A}$, $W_{c\ \alpha\ B}$, $W_{c\ \alpha\ C}$ are star-connected and coupled to the switching devices 3 and 4, respectively.

Figure 1A:
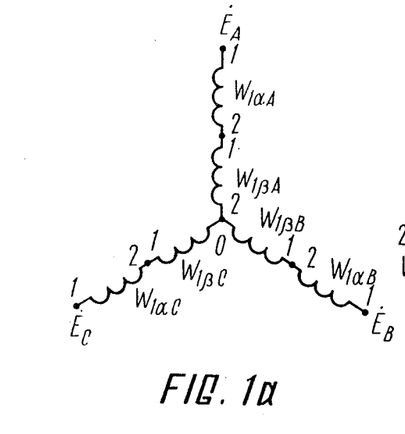
FIGS. 1a, 1b, 1c, 1d, 5a, 5b, 9a, 9b, 13a and 13b, are electric circuit diagrams of a phase shifter, according to the invention.
Figure 1B:
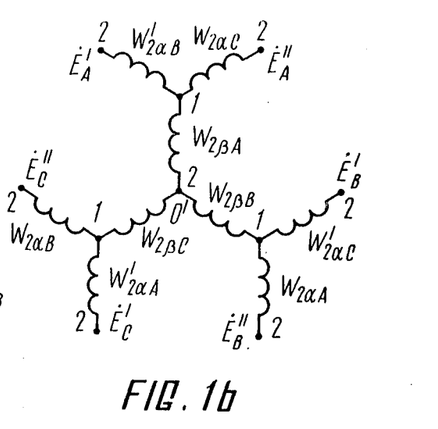
Figure 1C:
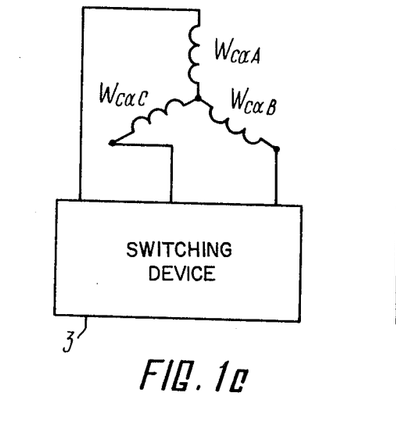
Figure 2:
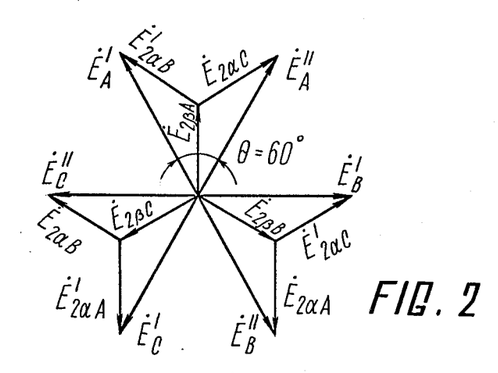
FIGS. 2,3,4,6,7,8,10,11,12,14, 15 and 16 are vector diagrams illustrating static states of the phase shifter.

FIG. 2 is a vector diagram of the output voltages $\dot{E}'_A$, $\dot{E}'_B$, $\dot{E}'_C$ and $\dot{E}''_A$, $\dot{E}''_B$, $\dot{E}''_C$ for the case where the switching devices 3 and 4 (FIG. 1) are in the "off" state, i.e. the control windings $W_{c\ \alpha\ A}$, $W_{c\ \alpha\ B}$, $W_{c\ \alpha\ C}$ and $W_{c\ \beta\ A}$, $W_{c\ \beta\ B}$, $W_{c\ \beta\ C}$ are disconnected. In the case where all parameters of both transformers are similar, the secondary voltages $\dot{E}_{2\ \alpha\ A}$, $\dot{E}_{2\ \alpha\ B}$, $\dot{E}_{2\ \alpha\ C}$ and $\dot{E}'_{2\ \alpha\ A}$, $\dot{E}'_{2\ \alpha\ B}$, $\dot{E}'_{2\ \alpha\ C}$ (FIG. 2) of the first transformer $\alpha$ and $\dot{E}_{2\ \beta\ A}$, $\dot{E}_{2\ \beta\ B}$, $\dot{E}_{2\ \beta\ C}$ of the second transformer $\beta$ are equal in magnitude. The output voltages $\dot{E}'_A$, $\dot{E}'_B$, $\dot{E}'_C$ and $\dot{E}''_A$, $\dot{E}''_B$, $\dot{E}''_C$ are found as a result of geometric addition of the secondary voltages $\dot{E}_{2\ \alpha\ A}$, $\dot{E}_{2\ \alpha\ B}$, $\dot{E}_{2\ \alpha\ C}$, $\dot{E}'_{2\ \alpha\ A}$, $\dot{E}'_{2\ \alpha\ B}$, $\dot{E}'_{2\ \alpha\ C}$ and $\dot{E}_{2\ \beta\ A}$, $\dot{E}_{2\ \beta\ B}$, $\dot{E}_{2\ \beta\ C}$ of both transformers in accordance with the following equations:

$$\dot{E}'_A = \dot{E}_{2\ \beta\ A} + \dot{E}'_{2\ \alpha\ B} \quad 1.$$
$$\dot{E}'_B = \dot{E}_{2\ \beta\ B} + \dot{E}'_{2\ \alpha\ C} \quad 2.$$
$$\dot{E}'_C = \dot{E}_{2\ \beta\ C} + \dot{E}'_{2\ \alpha\ A} \quad 3.$$
$$\dot{E}''_A = \dot{E}_{2\ \beta\ A} + \dot{E}_{2\ \alpha\ C} \quad 4.$$
$$\dot{E}''_B = \dot{E}_{2\ \beta\ B} + \dot{E}_{2\ \alpha\ A} \quad 5.$$
$$\dot{E}''_C = \dot{E}_{2\ \beta\ C} + \dot{E}_{2\ \alpha\ B} \quad 6.$$

The phase angle ¼ between the output voltages $\dot{E}'_A$ and $\dot{E}''_A$, $\dot{E}'_B$ and $\dot{E}''_B$, $\dot{E}'_C$ and $\dot{E}''_C$ is equal to 60°.

Figure 3:
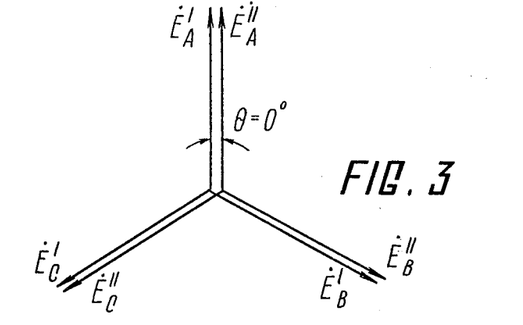
Figure 4:
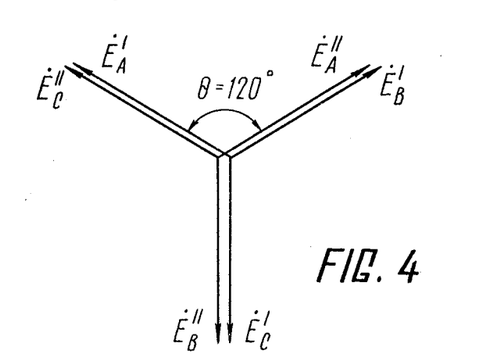

FIGS. 3 and 4 are vector diagrams of the output voltages when the phase angle $\theta$ is equal to 0° or 120°.

Figure 5A:
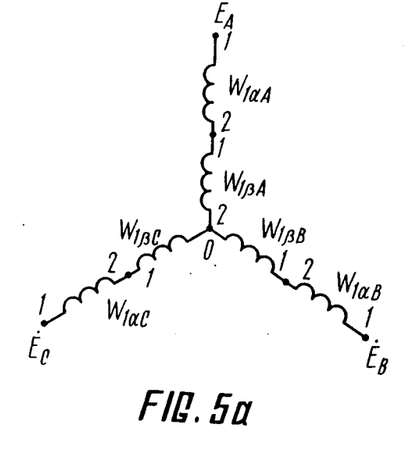
Figure 5B:
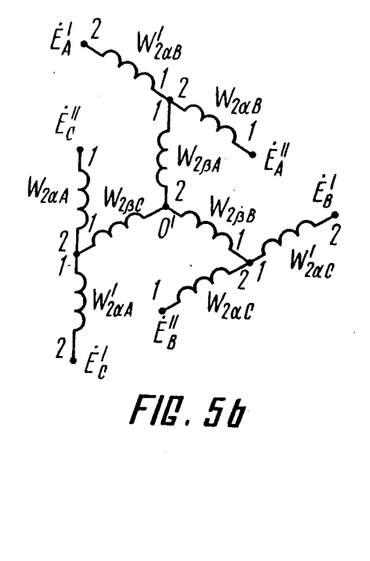

Turning now to FIG. 5a, 5b, primary windings $W_{1\ \alpha\ A}$ and $W_{1\ \beta\ A}$, $W_{1\ \alpha\ B}$ and $W_{1\ \beta\ B}$, $W_{1\ \alpha\ C}$ and $W_{1\ \beta\ C}$ of the first and second transformers $\alpha$ and $\beta$, respectively, are connected in a manner similar to FIG. 1a. The secondary windings $W_{2\ \beta\ A}$, $W_{2\ \beta\ B}$ and $W_{2\ \beta\ C}$ of the second transformer $\beta$ have their ends 2 star-connected with a common point $O'$. Connected to the beginning 1 of each secondary winding $W_{2\ \beta\ A}$, $W_{2\ \beta\ B}$ and $W_{2\ \beta\ C}$ of the second transformer $\beta$, respectively, is the common point of two series-aiding-connected secondary windings $W_{2\alpha\ B}$ and $W'_{2\ \alpha\ B}$, $W_{2\ \alpha\ C}$ and $W'_{2\alpha\ C}$, $W_{2\ \alpha\ A}$ and $W'_{2\ \alpha\ A}$ of the first transformer $\alpha$, the phase of the voltages across these windings following that of the voltage across a respective secondary winding of the second transformer $\beta$ in a preset phase alternation sequence in the power transmission system.

Figure 6:
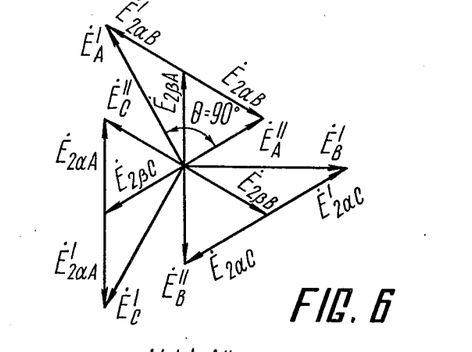

FIG. 6 is a vector diagram of the output voltages $\dot{E}'_A$, $\dot{E}'_B$, $\dot{E}'_C$ and $\dot{E}''_A$, $\dot{E}''_B$, $\dot{E}''_C$ for the case where the switching devices 3 and 4 (FIG. 1) are in the "off" state. If all parameters of both transformers are similar, the secondary voltages $\dot{E}_{2\ \alpha\ A}$, $\dot{E}_{2\ \alpha\ B}$, $\dot{E}_{2\ \alpha\ C}$ and $\dot{E}'_{2\ \alpha\ A}$, $\dot{E}'_{2\ \alpha\ B}$, $\dot{E}'_{2\ \alpha\ C}$ of the first transformer $\alpha$ and $\dot{E}_{2\ \beta\ A}$, $\dot{E}_{2\ \beta\ B}$, $\dot{E}_{2\ \beta\ C}$ of the second transformer $\beta$ are equal in magnitude. The output voltages $\dot{E}'_A$, $\dot{E}'_B$, $\dot{E}'_C$ and $\dot{E}''_A$, $\dot{E}''_B$, $\dot{E}''_C$ result from geometric addition of the secondary voltages of both transformers in accordance with the following equations:

$$\dot{E}'_A = \dot{E}_{2\ \beta\ A} + \dot{E}'_{2\ \alpha\ B} \quad 7.$$
$$\dot{E}'_B = \dot{E}_{2\ \beta\ B} + \dot{E}'_{2\ \alpha\ C} \quad 8.$$
$$\dot{E}'_C = \dot{E}_{2\ \beta\ C v} + \dot{E}'_{2\ \alpha\ A} \quad 9.$$
$$\dot{E}''_A = \dot{E}_{2\ \beta\ A} + \dot{E}_{2\ \alpha\ B} \quad 10.$$
$$\dot{E}''_B = \dot{E}_{2\ \beta\ B} + \dot{E}_{2\ \alpha\ C} \quad 11.$$
$$\dot{E}''_C = \dot{E}_{2\ \beta\ C} + \dot{E}_{2\ \alpha\ A} \quad 12.$$

The phase angle $\theta$ between the output voltages $\dot{E}'_A$ and $\dot{E}''_A$, $\dot{E}'_B$ and $\dot{E}''_B$, $\dot{E}'_C$ and $\dot{E}''_C$ is equal to 90°.

Figure 7:
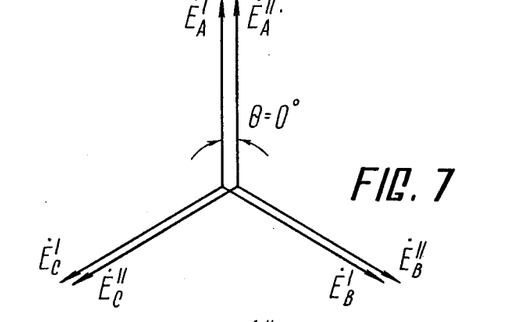
Figure 8:
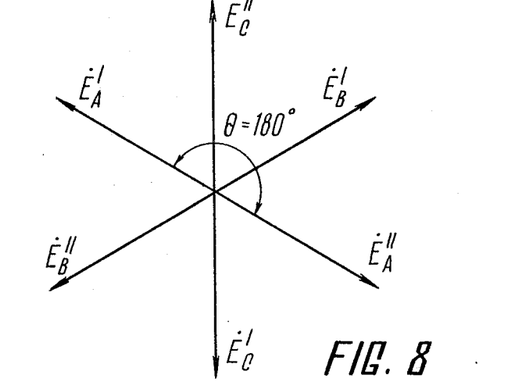

FIGS. 7 and 8 are vector diagrams of the output voltages when the phase angle $\theta$ equals 0° or 180°.

Figure 9A:
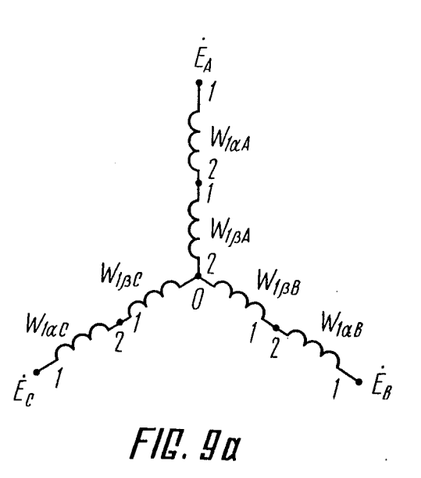
Figure 9B:
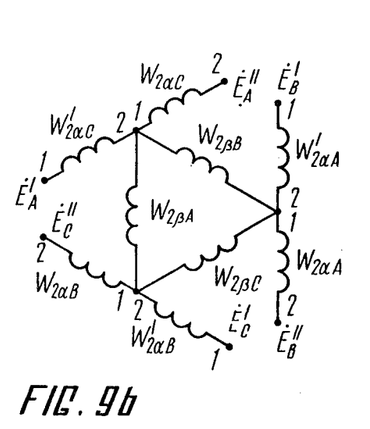

The primary windings $W_{1\ \alpha\ A}$ and $W_{1\ \beta\ A}$, $W_{1\ \alpha\ B}$ and $W_{1\ \beta\ B}$, $W_{1\ \alpha\ C}$ and $W_{1\ \beta\ C}$ FIG. 9a of the first and second transformers $\alpha$ and $\beta$, respectively, are series- and star-connected. The secondary windings $W_{2\ \beta\ A}$, $W_{2\ \beta\ B}$ and $W_{2\ \beta\ C}$ of the second transformer $\beta$ are delta-connected. Connected to the delta apex opposite the secondary winding $W_{2\beta C}$ of the second transformer $\beta$ is the common point of the series-aiding-connected secondary windings $W_{2\alpha C}$ and $W'_{2\alpha C}$ of the first transformer $\alpha$. Connected to the apex opposite the secondary winding $W_{2\beta A}$ of the second transformer $\beta$ is the common point of the series-aiding-connected secondary windings $W_{2\alpha A}$ and $W'_{2\alpha A}$ of the first transformer $\alpha$. And connected to the apex opposite the secondary winding $W_{2\beta B}$ of the second transformer $\beta$ is the common point of the series-aiding-connected secondary windings $W_{2\alpha B}$ and $W'_{2\alpha B}$ of the first transformer $\alpha$.

Figure 10:
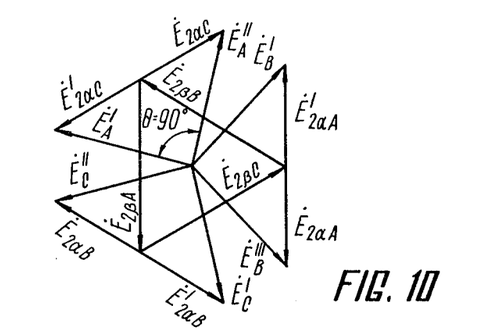

FIG. 10 is a vector diagram of the output voltages $\dot{E}'_A, \dot{E}'_B, \dot{E}'_C$ and $\dot{E}''_A, \dot{E}''_B, \dot{E}''_C$ for the case where the switching devices 3 and 4 are in the "off" state. The parameters of both transformers being similar, except for the transformation ratio $K_\beta$ of the second trasnformer $\beta$, which is $$K_\beta = \sqrt{3 \cdot K_\alpha} \qquad 13$$

wherein $K_\alpha$ is the transformation ratio of the first transformer $\alpha$, the phase angle $\theta$ equals 90°.

Figure 11:
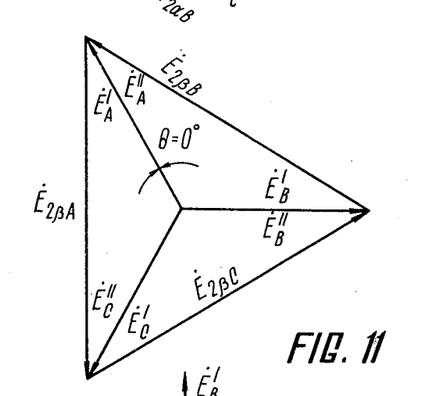
Figure 12:
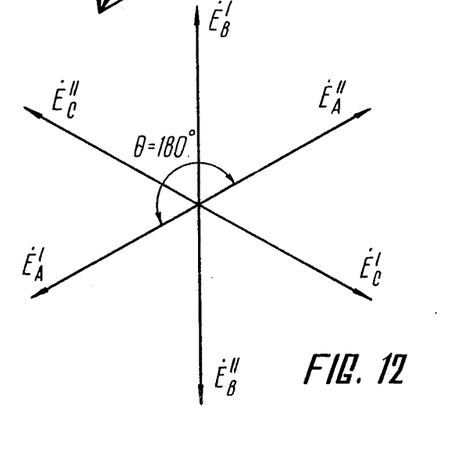

FIGS. 11 and 12 are vector diagrams of the output voltages for the phase angle $\theta$ equal to 0° and 180°.

Figure 1D:
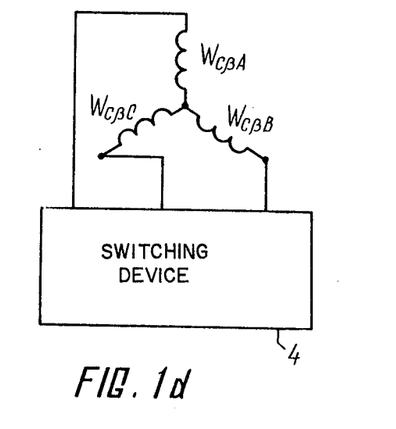
Figure 13A:
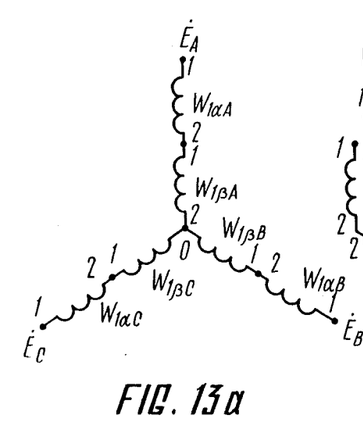
Figure 13B:
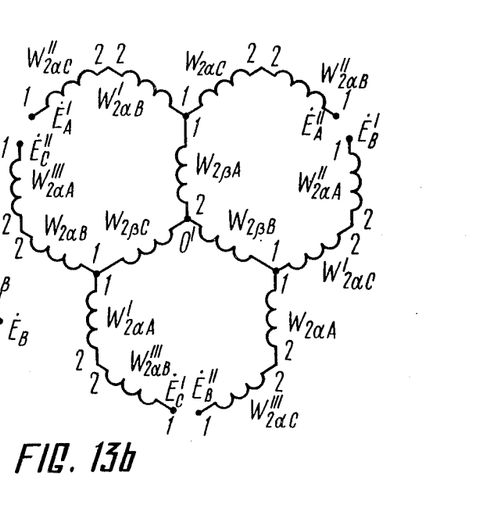

The primary windings $W_{1\alpha A}, W_{1\beta A}, W_{1\alpha B}$ and $W_{1\beta B}, W_{1\alpha C}, W_{1\beta C}$ FIG. 13a of the first and second three-phase transformers $\alpha$ and $\beta$, respectively, are connected similarly as shown in FIG. 1a-1d. The secondary windings $W_{2\beta A}, W_{2\beta B}$ and $W_{2\beta C}$ have their ends 2 star-connected with a common point O'. Coupled to the beginning 1 of the secondary winding $W_{2\beta A}$ of the second transformer $\beta$ are those of the secondary windings $W'_{2\alpha B}$ and $W_{2\alpha C}$, while connected to their ends 2 are those of the secondary windings $W''_{2\alpha C}$ and $W''_{2\alpha B}$ of the first transformer $\alpha$. Coupled to the beginning 1 of the secondary winding $W_{2\beta B}$ of the second transformer $\beta$ are those of the secondary windings $W_{2\alpha A}$ and $W'_{2\alpha C}$, while connected to their ends 2 are those of the secondary windings $W'''_{2\alpha C}$ and $W''_{2\alpha A}$ of the first transformer $\alpha$. And coupled to the beginning 1 of the secondary winding $W_{2\beta C}$ of the second transformer $\beta$ are those of the secondary windings $W_{2\alpha B}$ and $W'_{2\alpha A}$, while connected to their ends 2 are those of the secondary windings $W'''_{2\alpha A}$ and $W'''_{2\alpha B}$ of the first transformer $\alpha$. The control windings of both transformers are connected to switching devices as shown in FIG. 1a and FIG. 1d.

Figure 14:
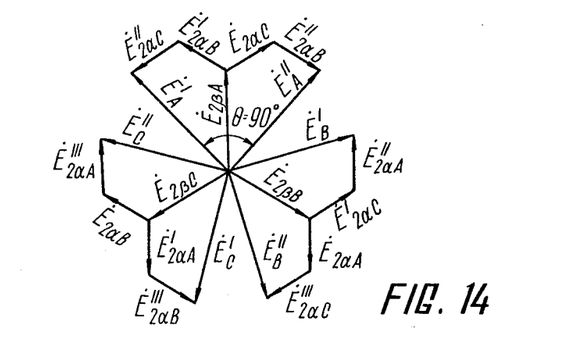

FIG. 14 is a vector diagram of the output voltage $\dot{E}'_A$, $\dot{E}'_B, \dot{E}'_C$ and $\dot{E}'_A$, and $\dot{E}''_B, \dot{E}''_C$ for the case where the switching devices 3 and 4 are in the "off" state. The phase angle $\theta$ between the output voltages $E'_A$ and $A''_A, E'_B$ and $E''_B, E'_C$ and $E''_C$ is equal to 90° just as in the previous embodiment.

Figure 15:
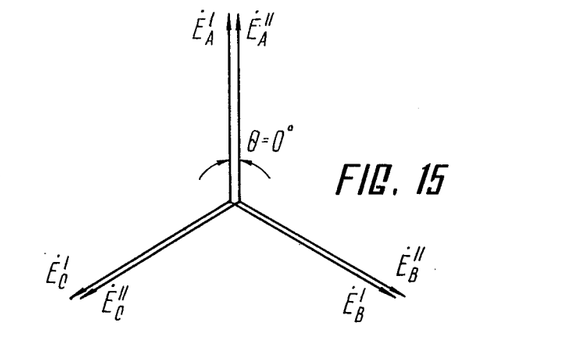
Figure 16:
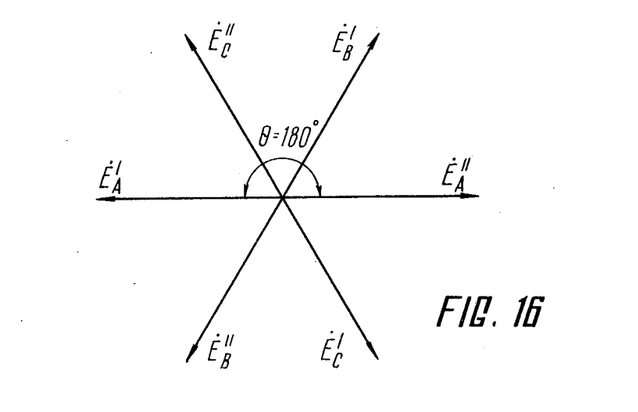

FIGS. 15 and 16 are vector diagrams of the output voltages for the phase angle $\theta$ equal to 0° and 180°.

Figure 17:
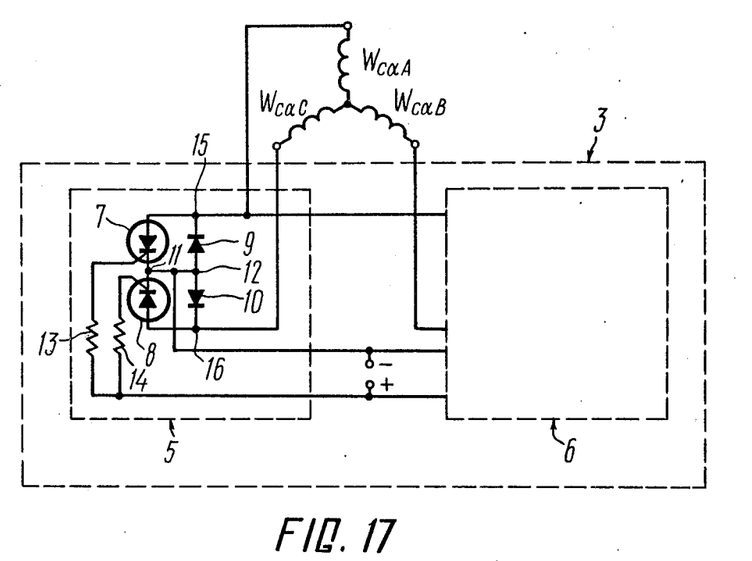
FIG. 17 is an electric circuit diagram of the switching devices.

FIG. 17 is a schematic of the switching device 3 and its connection to the control windings $W_{c\alpha A}, W_{c\alpha B}$ and $W_{c\alpha C}$ of the first transformer $\alpha$. The switching device 4 and its connection to the control windings of the second transformer $\beta$ are similar to those of the switching device 3.

Used as the switching device 3 are two full-wave static $a-x$ switches 5 and 6. The full-wave static switch 5 has two series connected thyristors 7 and 8 placed in parallel wherewith are two series-opposing-connected diodes 9 and 10. A point 11 of connection of the thyristors 7 and 8 is connected to a point 12 of connection of the diodes 9 and 10, both points being also connected to the negative terminal of a control signal source. The control electrodes of the thyristors 7 and 8 are coupled, via resistors 13 and 14, to the positive terminal of the control signal source. A point 15 of connection is coupled to the control winding $W_{c\alpha A}$, while a point 16 of connection is coupled to the control winding $W_{c\alpha C}$. The second full-wave static switch 6 is similar to the switch 5 and connected to the control windings $W_{c\alpha A}$ and $W_{c\alpha B}$. As the switching devices 3 and 4 use can also be made of power contact switches. The switching devices 3 and 4 can be connected directly in parallel with the primary windings $W_{1\alpha A}, W_{1\alpha B}, W_{1\alpha C}$ and $W_{1\beta A}, W_{1\beta B}, W_{1\beta C}$ of the first and second three-phase transformers, respectively.

Consider now two modes of operation of the phase shifter with one of the switching devices 3 and 4 being in the "on" state. In the first mode of operation, it is the switching device 3 (FIG. 1c) that is in the "on" state, whereas the switching device 4 is in the "off" state. As a control signal is applied to the control electrodes of the thyristors 7 and 8 (FIG. 17), the latter are rendered conducting; the thyristor 7 and diode 10 being conducting during the positive half-cycle, and the thyristor 8 and diode 9 being conducting during the negative half-cycle. The full-wave static switch 6 operates in a similar manner, therefore, the control windings $W_{c\alpha A}, W_{c\alpha B}$ and $W_{c\alpha C}$ of the first transformer become shorted. As a result, the voltages $E_A, E_B$ and $E_C$ (FIGS. $1^a, 5^a, 9^a$ and $13^a$) are practically fully applied to the primary windings $W_{1\beta A}, W_{1\beta B}$ and $W_{1\beta C}$ of the second transformer $\beta$ which carries all of the load. The voltages a cross the primary windings $W_{1\alpha A}, W_{1\alpha B}, W_{1\alpha C}$ and all the secondary windings of the first transformer are close to zero and the phase angle $\theta$ (FIGS. 3,7, 11 and 15) between the output voltages $E'_A$ and $E''_A, E'_B$ and $E''_B, E'_C$ and $E''_C$ approximates zero, too. This mode of operation is recommended for no-load or low load conditions in a-c power transmission lines of high power-carrying capacity. In this case, the power of the second transformer is approximately equal to half the maximum load.

The second mode of operation is characterized by the switching device 4 (FIGS. 1d) being in the "on" state and the switching device 3 being in the "off" state. In this case, the control windings $W_{c\beta A}, W_{c\beta B}$ and $W_{c\beta C}$ of the second transformer $\beta$ become shorted. As a result, the voltages $E_A, E_B$ and $E_C$ are practically fully applied to the primary windings $W_{1\alpha A}, W_{1\beta B}$ and $W_{1\beta C}$ of the first transformer $\alpha$ which carries all of the load. The voltages across the primary windings $W_{1\beta A}, W_{1\beta B}, W_{1\beta C}$ and secondary windings $W_{2\beta A}, W_{2\beta B}, W_{2\beta C}$ of the second transformer $\beta$ approach zero. The phase angle $\theta$ between the output voltages $E'_A$ and $E''_A, E'_B$ and $E''_B, E'_C$ and $E''_C$ may in this case be equal to 120° (FIG. 4) or 180° (FIGS. 8, 12 and 16). This mode of operation is recommended for high load conditions prevailing in a-c power transmission lines of high power-carrying capacity.

Since the power of the first transformer $\alpha$ is equal to the maximum load capacity and the power of the second transformer $\beta$ is equal to half the maximum load capacity, the installed power of the phase shifter equals one and a half of the maximum load capacity. In addition, the use in the phase shifter of two series-connected transformers α and β substantially reduces the longitudinal resistance introduced into the load circuit.

Thus, the herein disclosed phase shifter makes it possible, depending on the load and with the control windings of one of the transformers shorted, to switch over a power transmission system of high power-carrying capacity from operation with the phase angle $\theta$ between the voltages of the entry to adjacent lines being equal to 0° to operation with the phase angle being equal to 120° or 180°.

What is claimed is:

1. A phase shifter comprising three-phase multiwinding transformers, each of said transformers having primary windings connected in series with respect to like phases and arranged in a three-phase system, and having secondary windings and control windings, a first three-phase transformer having other secondary windings connected to said secondary windings of the first transformer, said secondary windings being arranged in a three-phase system, switching devices, the control windings of each three-phase transformer being connected to respective switching devices, the beginnings of the two secondary windings of the two other phases of the first three-phase transformer being connected to the beginnings of the secondary windings of each phase of the second transformer, the ends of said secondary windings of each phase of the second transformer being connected to a common neutral point.

2. A phase shifter in accordance with claim 1, wherein said first three-phase transformer has third and fourth secondary windings, the end of each winding being connected to the end of one of the first two secondary windings differing in phase, as well as to a respective secondary winding of said second three-phase transformer.

3. A phase shifter in accordance with claim 1, wherein the beginning of each secondary winding of the second three-phase transformer is connected to the common point of two series-aiding-connected secondary windings of said first three phase transformer, the phase of the voltages thereacross following that of the voltage across a respective secondary winding of said second three-phase transformer in a preset phase alternation sequence in a power transmission system.

4. A phase shifter in accordance with claim 1, wherein secondary windings of said second three-phase transformer are delta-connected, each delta apex having connected thereto said common point of a pair of series-aiding-connected secondary windings of said first three-phase transformer, the phase of the voltages across each said pair of series-aiding-connected secondary windings of said first three-phase transformer coinciding with that of the voltage across said secondary winding of said second three-phase transformer opposite a respective delta apex.

* * * * *